Nov. 5, 1940.   C. G. WOOD   2,220,566
CLUTCH
Original Filed March 17, 1938
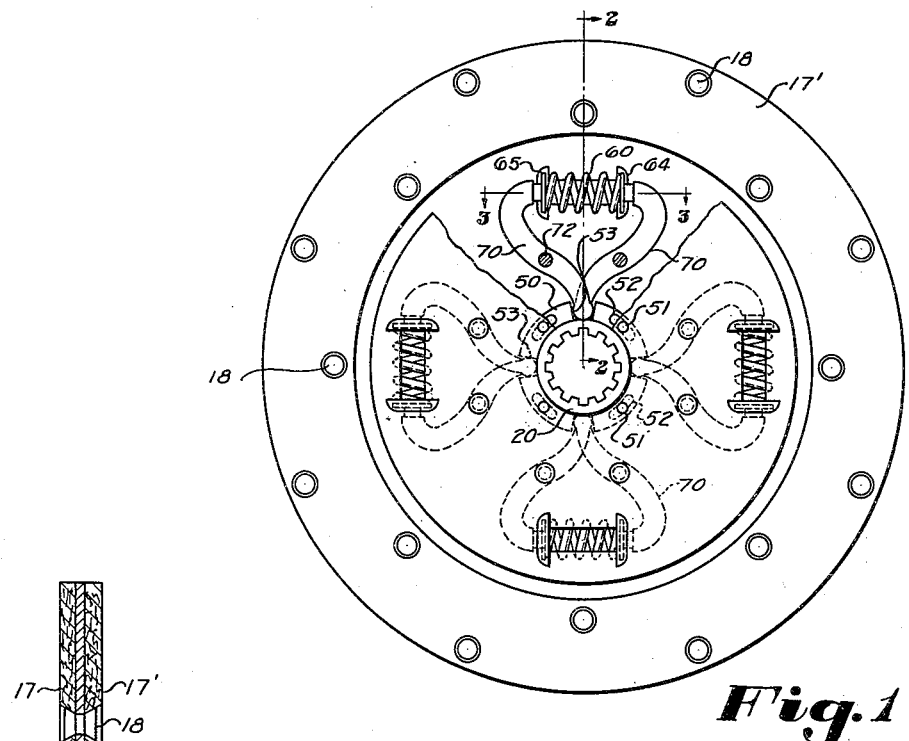
Fig.1
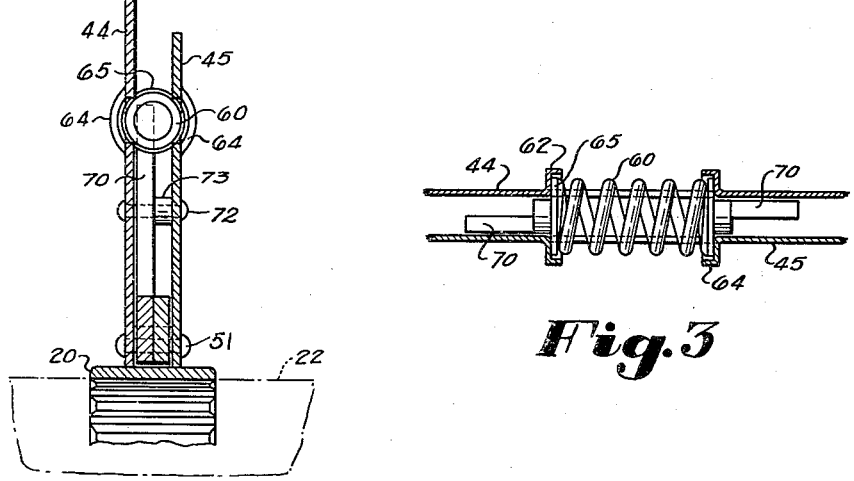
Fig.2   Fig.3
INVENTOR.
CLARENCE G. WOOD
BY *Fay, Oberlin, Williams & Fay*
ATTORNEYS.

Patented Nov. 5, 1940

2,220,566

UNITED STATES PATENT OFFICE 2,220,566

CLUTCH

Clarence G. Wood, Cleveland, Ohio, assignor to Monmouth Products Company, Cleveland, Ohio, a corporation of Ohio Original application March 17, 1938, Serial No. 196,378. Divided and this application April 29, 1940, Serial No. 332,262

2 Claims. (Cl. 192—68)

This invention relates to a friction clutch, and more particularly to one adapted for automotive use. Clutches for this service which must convey the rotative force of the motor to the rear axle assembly necessarily encounter considerable shock at the instant of engagement. If this shock is of a magnitude occasioned by instantaneous gripping of the clutch surface considerable strain is placed on the mechanical parts and the surfaces themselves wear very rapidly.

The chief object of my invention has been to provide a clutch wherein a lost-motion connection is provided, which becomes active at the instant of engagement of the clutch surface to permit a slight lag before the axle load is picked up by the motor. Such a lag need exist only for a very short period of time which in practice is equivalent to a very small rotative component.

An additional object of the invention has been to provide a linkage connecting two portions of the clutch together to cause the rotation as a unit and which linkage is resiliently positioned to maintain such rotation and yet be susceptible to the lost motion above set out.

Additional objects of the invention will become apparent from the following specification and appended drawing, while the novel features will be summarized in the claims.

In said annexed drawing—

Fig. 1 is a plan view of a clutch plate embodying my invention;

Fig. 2 is a section through the clutch plate, taken on the line indicated by the arrows 2—2 of Fig. 1; and Fig. 3 is a fragmentary cross-sectional view through the clutch on the line indicated by the arrows 3—3 of Fig. 1.

Referring to the drawing, I provide a plate 44 in the outer periphery of which is secured the annular clutch facings 17 and 17' by suitable rivets 18. A splined hub 20, slidably mounted on the driven shaft 22, is provided and is resiliently connected to the plate 44 as hereinafter described.

The main clutch plate 44 is supplemented by a plate 45 spaced axially therefrom. The plates 44 and 45 are mounted on the hub 20 as follows:

The hub 20 includes an outwardly projecting spider 50. The plates 44 and 45 are riveted together by rivets 51 which pass through annularly extending slots 52 in the spider 50 and retain the plates and spider together against axial movement while permitting rotative movement therebetween. The spider 50 is provided with four slots 53 equally spaced thereabout.

There is also provided a pair of arms or fingers 70 pivoted between the plates 44 and 45, as at 72. Due to the spacing between the plates 44 and 45, a spacing collar 73 is employed to maintain the respective fingers in position.

The pivotal movement of the fingers 70 is limited by strong compression springs 60 carried by the plates 44 and 45 and bearing at their ends against thrust members 65 which, in turn, are disposed within cup-like seats 62 and 64, which are formed by bending the metal of the plates 10 outwardly at circumferentially spaced points. The thrust members 65 bear against the fingers 70.

The ends of the arms or fingers 70 remote from the springs 60 lie within the slots 53 of the spider 50.

As the left hand finger, as viewed in Fig. 1, is rocked in a clockwise direction, the right-hand end of the spring 60 is prevented from movement to the right by engagement with the right-hand thrust member 65. Thus the spring tends to oppose the left-hand finger 70. If the right-hand finger 70 tends to shift in a counter-clockwise direction, the left-hand end of the spring 60 will be similarly prevented from moving and the spring will act to oppose the movement of the said finger.

Thus, the fingers coact with the springs and the spider to limit the motion between the plate assembly 44—45 and the hub 20.

From the foregoing description it will be apparent that I have provided an improved clutch plate construction in which simple link members or fingers, under the influence of springs, permit and yet limit relative rotative movement between the clutch plate facings and the splined hub connection to the driven shaft.

This application is a division of my copending application, Serial No. 196,378, filed March 17, 1938.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A clutch construction comprising a central hub, a clutch plate carried thereby and rotatable with respect thereto, a series of radial shoulders on said hub coacting to provide a series of annularly spaced recesses, pairs of arms pivotally carried by said plate with ends of the arms of each pair lying in said recesses, spring members carried by said plate with the ends of each spring resiliently acting against the other ends of the arms of each pair.

2. A clutch construction comprising a central hub, a clutch plate carried thereby and rotatable with respect thereto, a series of radial shoulders on said hub coacting to provide a series of annularly spaced recesses, a plurality of pairs of arms pivotally carried by said plate with ends of the arms of each pair lying in said recesses, compression spring members carried by said plate with the ends of each spring resiliently acting against the other ends of the arms of each pair, whereby to yieldingly prevent relative movement between said arms and said plate and thereby yieldingly prevent rotative movement between said plate and said hub.

CLARENCE G. WOOD.